US012455529B2

(12) United States Patent

Eda et al.

(10) Patent No.: US 12,455,529 B2

(45) Date of Patent: Oct. 28, 2025

(54) CHARGE ELIMINATING APPARATUS AND IMAGE FORMING SYSTEM

(71) Applicant: CANON KABUSHIKI KAISHA, Tokyo (JP)

(72) Inventors: Hiroyuki Eda, Ibaraki (JP); Ryou Sakaguchi, Chiba (JP); Riki Fukuhara, Chiba (JP); Shin Iwasaki, Chiba (JP); Yuko Shimpo, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/633,756

(22) Filed: Apr. 12, 2024

(65) Prior Publication Data

US 2024/0361720 A1 Oct. 31, 2024

(30) Foreign Application Priority Data

Apr. 26, 2023 (JP) ................................ 2023-071994

(51) Int. Cl.
*G03G 21/06* (2006.01)
*G03G 15/00* (2006.01)

(52) U.S. Cl.
CPC ......... *G03G 21/06* (2013.01); *G03G 15/6529* (2013.01); *G03G 15/6573* (2013.01); *G03G 2215/00215* (2013.01); *G03G 2215/00679* (2013.01)

(58) Field of Classification Search
CPC ............... G03G 15/0266; G03G 21/06; G03G 15/5029; G03G 15/6573
See application file for complete search history.

(56) References Cited

U.S. PATENT DOCUMENTS

| | | | | |
|---|---|---|---|---|
| 2002/0076239 A1* | 6/2002 | Inoue | G03G 15/0216 399/175 |
| 2021/0216027 A1* | 7/2021 | Tanaka | G03G 15/6573 |
| 2022/0324672 A1* | 10/2022 | Hamabata | B65H 29/56 |

FOREIGN PATENT DOCUMENTS

JP 2019167169 A 10/2019

* cited by examiner

*Primary Examiner* — Jessica L Eley
(74) *Attorney, Agent, or Firm* — ROSSI, KIMMS & McDOWELL LLP

(57) ABSTRACT

A charge eliminating apparatus includes a charge eliminating member, a moving unit, and a controller. The controller configured to execute a first processing in which charge of a sheet is eliminated by applying voltage to the charge eliminating member in a state where the charge eliminating member is positioned at a contact position, and a second processing in which charge of a sheet is not eliminated while voltage is not applied to the charge eliminating member in a state where the charge eliminating member is positioned at the contact position. In a mixed job in which a first type of sheet and a second type of sheet that differs from the first type of sheet are conveyed, the controller is configured to execute the first processing to the first type of sheet and execute the second processing to the second type of sheet.

11 Claims, 14 Drawing Sheets

FIG.8

| SHEET TYPE | CONTACT-TYPE CHARGE ELIMINATING UNIT | NONCONTACT-TYPE CHARGE ELIMINATING UNIT |
|---|---|---|
| PLAIN PAPER | 0V | 800V |
| THICK PAPER | 0V | 800V |
| COATED PAPER | 0V | 800V |
| SYNTHETIC SHEET | -800V | 800V |
| ... | ... | ... |

CHARGE ELIMINATING APPARATUS AND IMAGE FORMING SYSTEM

BACKGROUND OF THE INVENTION

Field of the Invention

The present invention relates to a charge eliminating apparatus for eliminating charge of a sheet-like recording material, and an image forming system adopting the charge eliminating apparatus.

Description of the Related Art

Hitherto, in image forming apparatuses adopting an electrophotographic system, charge may be generated on the sheet after an image is formed thereto, since a high voltage is applied to the sheet when forming an image thereon. Therefore, conveyance failure may occur by electrostatic attraction of the sheet to a conveyance path within the apparatus, or stacking failure may occur by electrostatic force that is generated between sheets when stacking the sheets having been discharged from the apparatus. Regarding such problems, a charge eliminating apparatus for removing static electricity from the sheets is proposed. As the charge eliminating apparatus, for example, there has been developed an apparatus equipped with two charge eliminating units, which are a contact-type charge eliminating unit that comes into contact with the sheets being conveyed and a noncontact-type charge eliminating unit disposed downstream of the contact-type charge eliminating unit in the conveyance direction (refer to Japanese Patent Application Laid-Open Publication No. 2019-167169).

In this type of charge eliminating apparatus, a charge eliminating roller pair used in the contact-type charge eliminating unit may be worn each time charge of the sheet is eliminated, and a charge elimination ability of the roller pair may be deteriorated through long-term use. Therefore, the charge eliminating roller pair is designed to move between a contact position in which the rollers are in contact with each other and a retracting position in which the rollers are separated from each other, and in order to prevent wear of the rollers, when a sheet that does not require elimination of charge is passed through, the charge eliminating roller pair is positioned at the retracting position.

According to the charge eliminating apparatus disclosed in Japanese Patent Application Laid-Open Publication No. 2019-167169 mentioned above, the charge eliminating roller pair is positioned at the retracting position when a sheet that does not require elimination of charge is passed through. Time is required to move the charge eliminating roller pair from the contact position to the retracting position or to move the same from the retracting position to the contact position. Therefore, when an image forming job in which a type of sheet that requires elimination of discharge and a type of sheet that does not require elimination of discharge are mixed, the charge eliminating roller pair is moved from the contact position to the retracting position or from the retracting position to the contact position when the sheet type changes. Thereby, compared to a case where the same type of sheet are conveyed successively and subjected to charge elimination, the interval time between sheets is elongated and the productivity may be deteriorated.

The present invention provides a charge eliminating apparatus and an image forming system that enable to improve productivity.

SUMMARY OF THE INVENTION

According to a first aspect of the present invention, a charge eliminating apparatus includes a charge eliminating member configured to come into contact with a sheet conveyed and eliminate charge of the sheet by voltage applied to the charge eliminating member, a moving unit configured to move the charge eliminating member to a contact position in which the charge eliminating member is in contact with the sheet and to a retracting position in which the charge eliminating member is separated from the sheet, and a controller configured to execute a first processing in which charge of a sheet is eliminated by applying voltage to the charge eliminating member in a state where the charge eliminating member is positioned at the contact position, and a second processing in which charge of a sheet is not eliminated while voltage is not applied to the charge eliminating member in a state where the charge eliminating member is positioned at the contact position. In a mixed job in which a first type of sheet and a second type of sheet that differs from the first type of sheet are conveyed, the controller is configured to execute the first processing to the first type of sheet and execute the second processing to the second type of sheet.

According to a second aspect of the present invention, an image forming system includes an image forming apparatus configured to form an image on a sheet, and the charge eliminating apparatus configured to receive a sheet to which an image has been formed by the image forming apparatus and to eliminate charge of the sheet.

Further features of the present invention will become apparent from the following description of exemplary embodiments with reference to the attached drawings.

BRIEF DESCRIPTION OF THE DRAWINGS

FIG. 8 is a table illustrating a relationship between sheet types and applied voltage in a contact-type charge eliminating unit and in a noncontact charge eliminating apparatus.

DESCRIPTION OF THE EMBODIMENTS

The present embodiment will be described below with reference to the drawings. At first, a schematic configuration of an image forming system 1 according to the present embodiment will be described with reference to FIG. 1. Dimensions, materials, and relative positions of the components of the image forming system 1 are not intended to limit the scope of the present invention thereto, unless denoted otherwise. Further, according to the present embodiment, a full-color copying machine having a plurality of photosensitive drums is applied as an image forming apparatus 2 of the image forming system 1. However, the present technique is not limited thereto, and the technique may be applied to a monochrome or mono-color copying machine or printer having only one photosensitive drum.

Image Forming System

Figure 1:
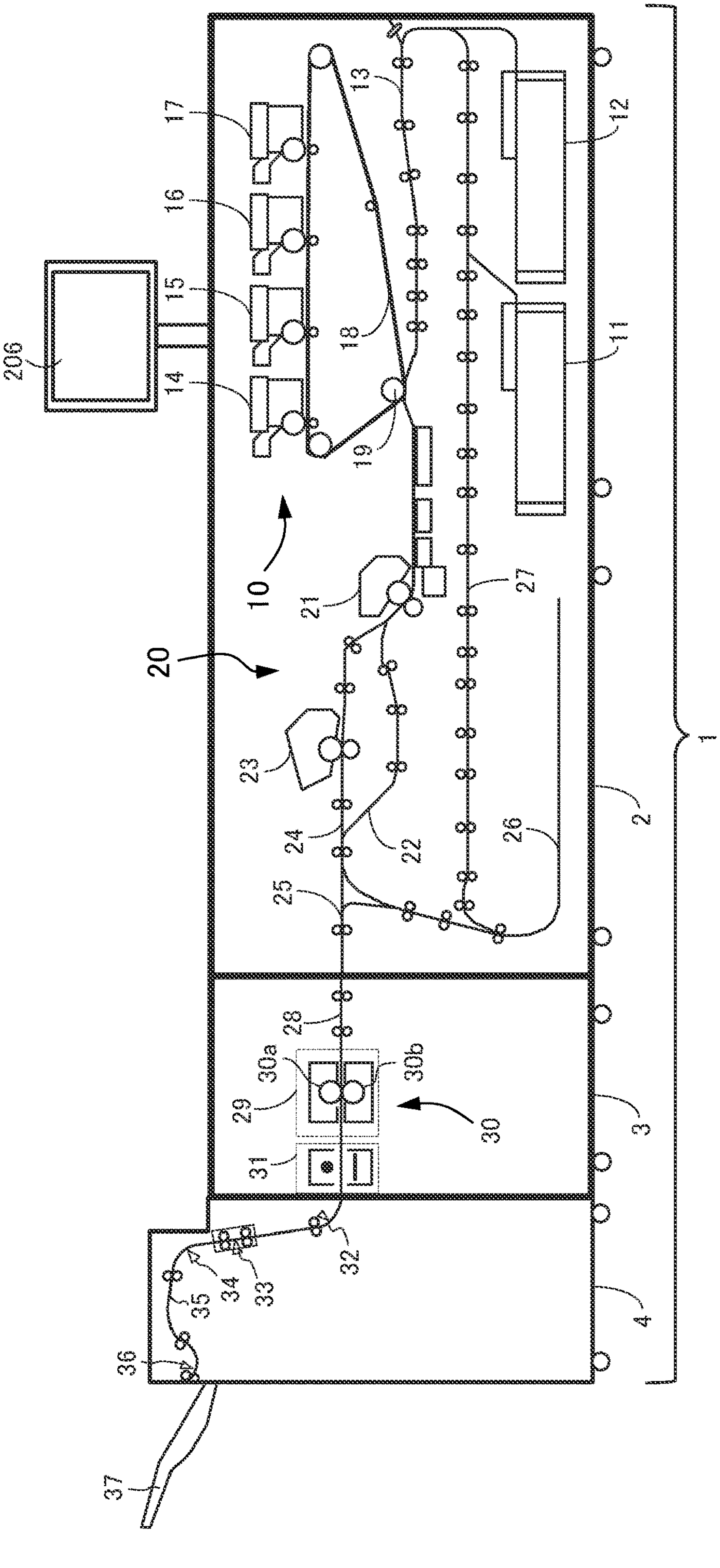
FIG. 1 is a cross-sectional view illustrating an image forming system according to an embodiment.

FIG. 1 is a cross-sectional view illustrating a configuration of a main portion of the image forming system 1 according to the present embodiment. The image forming system 1 includes the image forming apparatus 2 for forming an image on a sheet S, a charge eliminating apparatus 3, and a finisher 4.

The image forming apparatus 2 includes sheet feed decks 11 and 12, an image forming unit 10, a fixing unit 20, and a display 206. Each of the sheet feed decks 11 and 12 may store various types of sheets S. In each of the sheet feed decks 11 and 12, a single uppermost sheet S may be separated from the stored sheets S and conveyed to a conveyance path 13. The display 206 displays a printing state and information related to setting of the image forming system 1.

The fixing unit 20 is provided to fix a toner image to the sheet S, and includes a first fixing unit 21 and a second fixing unit 23. The first fixing unit 21 includes a heating roller and a pressing roller, and by having the sheet S pass through the respective rollers, toner is melted and pressed, by which the toner image is fixed to the sheet S. The sheet S having exited the first fixing unit 21 is passed through a conveyance path 22 and conveyed to a conveyance path 25. In a case where further melting and pressing is necessary depending on the type of the sheet S, after passing through the first fixing unit 21, the sheet is conveyed to the second fixing unit 23 through a conveyance path that differs from the conveyance path 22 and that is disposed above the conveyance path 22, where additional melting and pressing is applied thereto. Thereafter, the sheet S is conveyed through a conveyance path 24 to the conveyance path 25. In the case where an image forming mode is duplex printing, the sheet S is conveyed to a sheet reverse conveyance path 26, reversed in the sheet reverse conveyance path 26, and conveyed to a duplex conveyance path 27, where image transfer is executed to a second side that is opposite to a first side of the sheet by a secondary transfer roller 19.

The charge eliminating apparatus 3 receives the sheet S on which the image has been formed by the image forming apparatus 2, and eliminates charge of the sheet S. The charge eliminating apparatus 3 includes a conveyance path 28 that receives the sheets S having passed through the conveyance path 25, and a contact-type charge eliminating unit 29 and a noncontact-type charge eliminating unit 31 that eliminate charge of the received sheets S. According to the charge eliminating apparatus 3, charge elimination of the sheet S is performed by applying a high voltage to the contact-type charge eliminating unit 29 and the noncontact-type charge eliminating unit 31. The sheet S having passed through the contact-type charge eliminating unit 29 and the noncontact-type charge eliminating unit 31 and subjected to charge elimination processing is conveyed to the finisher 4. The noncontact-type charge eliminating unit 31 is an example of a noncontact charge eliminating unit, which is arranged downstream of a charge eliminating roller pair 30 of the contact-type charge eliminating unit 29 in a sheet conveyance direction, and eliminates charge of the sheet S conveyed from the charge eliminating roller pair 30 in a noncontact manner.

The finisher 4 is a sheet supporting apparatus capable of supporting a large amount of sheets S conveyed from the charge eliminating apparatus 3. The finisher 4 includes a conveyance path 35 through which the sheets S conveyed from the charge eliminating apparatus 3 are received, and a stack tray 37 that is disposed continuously from the conveyance path 35 and that supports the sheets S. Conveyance sensors 32, 33, 34, and 36 that detect the passing of a sheet S are disposed on the conveyance path 35. If a leading edge of a sheet or a trailing edge of a sheet has not been detected by the conveyance sensors 32, 33, 34, and 36 in the finisher 4 even after a predetermined time has elapsed, it is determined that sheet jamming has occurred in the finisher 4, and the image forming apparatus 2 is notified that jamming has occurred.

Control System of Image Forming System

Figure 2:
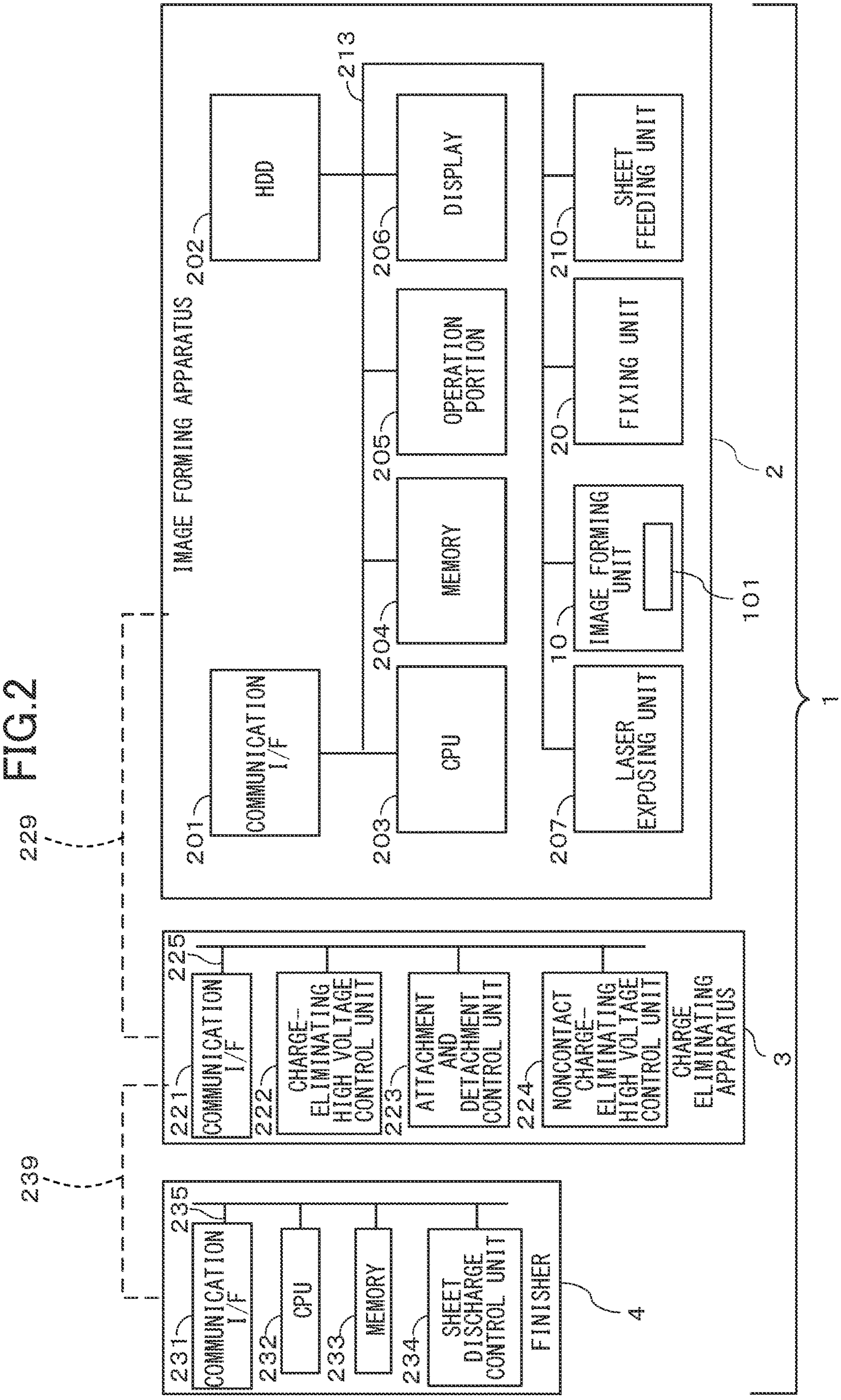
FIG. 2 is a control block diagram illustrating a control system of the image forming system according to the embodiment.

FIG. 2 is a block diagram illustrating a system configuration of the image forming system 1. At first, a control system of the image forming apparatus 2 will be described. The image forming apparatus 2 includes a communication I/F 201, an HDD 202, a CPU 203, a memory 204, an operation portion 205, the display 206, a laser exposing unit 207, the image forming unit 10, the fixing unit 20, and a sheet feeding unit 210. The respective components are connected through a system bus 213.

The communication I/F 201 is connected to the charge eliminating apparatus 3 through a communication cable 229, and communication is performed for controlling the respective apparatuses. The HDD 202 is a storage device for storing programs and data. The CPU 203 performs image processing control and printing control comprehensively based on programs stored in the HDD 202. In the present embodiment, the CPU 203 is one example of a controller that controls the contact-type charge eliminating unit 29 and the noncontact-type charge eliminating unit 31. The memory 204 stores programs required by the CPU 203 for performing various processing, and image data, and it operates as a work area.

The operation portion 205 receives input of various settings and operation instructions from the user. Setting information and processing states of a print job of the image forming apparatus 2 are displayed on the display 206. The user may set the type of sheet stored in the respective sheet feed decks 11 and 12 through the operation portion 205. Further, the user may also set whether elimination of charge is necessary for arbitrary sheet types through the operation portion 205. Alternatively, instead of having the user enter the settings, the CPU 203 may automatically set whether elimination of charge is necessary based on the sheet type stored in each of the sheet feed decks 11 and 12.

The laser exposing unit 207 performs primary charge for irradiating the photosensitive drum with laser light for transferring a toner image thereto, and executes laser exposure. In the laser exposing unit 207, at first, primary charge is performed to charge a surface of the photosensitive drum to a uniform negative potential. Next, the photosensitive drum is irradiated with laser light from a laser driver with a reflection angle of laser light adjusted using a polygon mirror. Thereby, negative charge of the portion having been irradiated is neutralized, and an electrostatic latent image is formed.

The image forming unit 10 is an apparatus for forming a toner image and transferring the toner image onto a sheet S, and includes four processing units 14, 15, 16, and 17 for forming toner images of four colors, which are yellow (Y), magenta (M), cyan (C), and black (K) (refer to FIG. 1). The processing units 14, 15, 16, and 17 are each composed of an image developing unit, a transfer unit, and a toner replenishment unit, and transfers the toner image on the photosensitive drum through an intermediate transfer belt 18 to the sheet S. In the image developing unit, negatively charged toner from a developing cylinder is attached to an electrostatic latent image on the surface of the photosensitive drum, and the image is visualized. In the transfer unit, primary transfer of applying a positive potential to the primary transfer roller and transferring the toner image on the surface of the photosensitive drum to the intermediate transfer belt 18 is performed. Thereafter, a secondary transfer of applying a positive potential to a secondary transfer outer roller not shown and transferring the toner image on the intermediate transfer belt 18 to the sheet S is performed. The fixing unit 20 is a device for melting the toner on the sheet S and fixing the same to the sheet S by heat and pressure, and it is composed of the first fixing unit 21 and the second fixing unit 23. The sheet feeding unit 210 is a device for feeding the sheet S, and the feeding operation and the conveying operation of the sheet S is controlled through rollers and various sensors.

Next, a control system of the charge eliminating apparatus 3 will be described. The charge eliminating apparatus 3 includes a communication I/F 221, a charge-eliminating high voltage control unit 222, an attachment and detachment control unit 223, and a noncontact charge-eliminating high voltage control unit 224, wherein the respective components are connected through a system bus 225. The communication I/F 221 is connected to the image forming apparatus 2 through the communication cable 229, and communication necessary for control is performed. The charge-eliminating high voltage control unit 222, the attachment and detachment control unit 223, and the noncontact charge-eliminating high voltage control unit 224 perform various controls based on a control command from the CPU 203 received through the communication cable 229. The charge-eliminating high voltage control unit 222 controls elimination of charge by the contact-type charge eliminating unit 29. The attachment and detachment control unit 223 controls the attachment and detachment of two charge eliminating rollers 30*a* and 30*b* described later by an attaching and detaching mechanism 150 (refer to FIGS. 5A and 5B). The noncontact charge-eliminating high voltage control unit 224 controls elimination of discharge by the noncontact-type charge eliminating unit 31.

Next, a control system of the finisher 4 will be described. The finisher 4 includes a communication I/F 231, a CPU 232, a memory 233, and a sheet discharge control unit 234, wherein the respective components are connected through a system bus 235. The communication I/F 231 is connected to the charge eliminating apparatus 3 through a communication cable 239, and communication necessary for control is performed. The CPU 232 performs various controls necessary for sheet discharge based on a control program stored in the memory 233. The memory 233 is a storage device storing control programs. The sheet discharge control unit 234 performs control to send the conveyed sheet S to the stack tray 37 based on the instructions from the CPU 232.

Charge Eliminating Apparatus

The secondary transfer roller 19 of the present embodiment applies a negative voltage to the sheet S, by which the upper surface of the sheet S is charged negatively, and the lower surface of the sheet S is charged positively by dielectric polarization. Therefore, if the sheet S is supported on the stack tray 37 without performing the charge elimination processing, the supported sheets are mutually stuck to each other by electrostatic force. In order to prevent attaching of the sheets S by electrostatic force, according to the present embodiment, the charge on the surface of the sheet S is removed by the charge eliminating apparatus 3. The charge eliminating apparatus 3 includes two charge eliminating units, which are the contact-type charge eliminating unit 29 and the noncontact-type charge eliminating unit 31 (refer to FIG. 1).

Contact-Type Charge Eliminating Unit

Figure 3:
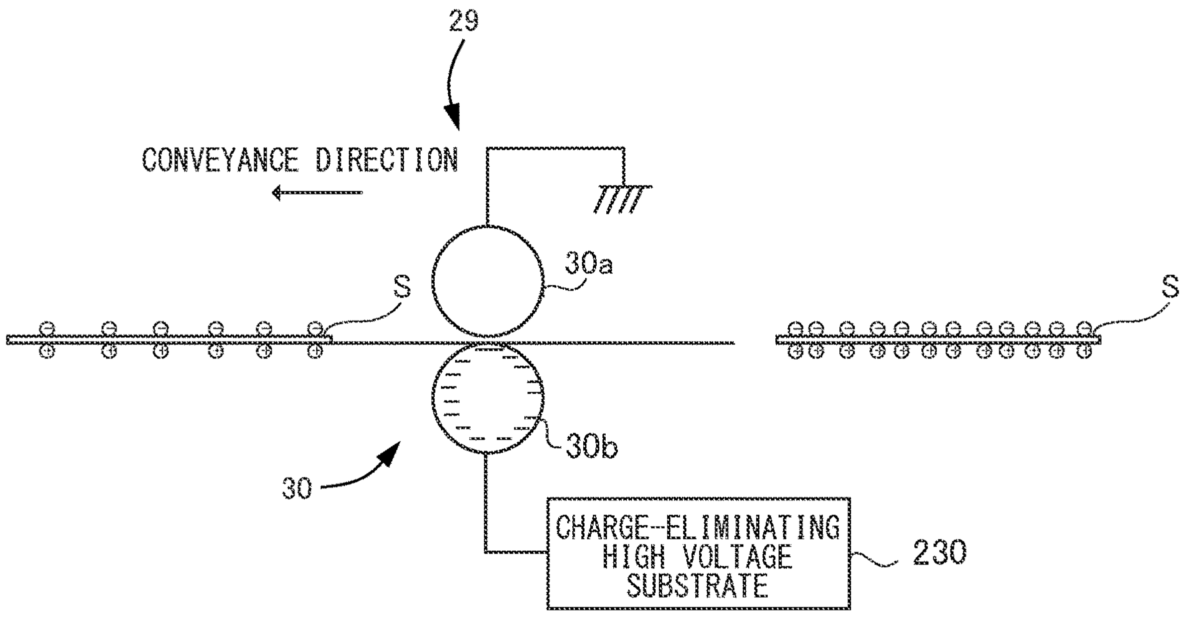
FIG. 3 is a cross-sectional view illustrating a contact-type charge eliminating unit according to the embodiment.

FIG. 3 is a cross-sectional view illustrating a charge elimination processing by the contact-type charge eliminating unit 29. The contact-type charge eliminating unit 29 includes one charge eliminating roller pair 30 that is arranged upstream of the noncontact-type charge eliminating unit 31 in the sheet conveyance direction, wherein the pair of rollers are arranged opposed to and in contact with each other. The charge eliminating roller pair 30 includes the charge eliminating rollers 30*a* and 30*b* formed of sponge, for example, and a rotation shaft 30*c* that supports the charge eliminating rollers 30*a* and 30*b* rotatably (refer to FIG. 5A), by which the sheet S is nipped, conveyed, and eliminated of charge. In the present embodiment, the charge eliminating rollers 30*a* and 30*b* formed of sponge is used, such that the charge eliminating rollers 30*a* and 30*b* may be worn by being in contact with each other and rotated. In the present embodiment, the charge eliminating rollers 30*a* and 30*b* are composed of sponge rollers, but the present technique is not limited thereto, and for example, one of the charge eliminating rollers 30*a* and 30*b* may be formed of a metal roller.

The charge-eliminating high voltage control unit 222 (refer to FIG. 2) uses a charge-eliminating high voltage substrate 230 serving as a voltage applying unit to apply a negative voltage to the charge eliminating roller 30*b* and to eliminate positive charge existing on the lower surface of the sheet S. The charge eliminating roller 30*a* is grounded. In the present embodiment, the charge eliminating roller pair 30 is an example of a conveyance unit for conveying the sheet S, and it is also an example of a charge eliminating member that comes into contact with the sheet S being conveyed and that eliminates charge of the sheet S by voltage applied thereto. Other than the charge eliminating roller pair 30, the charge eliminating apparatus 3 includes a plurality of conveyance roller pairs for conveying the sheets in the conveyance path 28.

When the positive charge existing on the lower surface of the sheet S is reduced, the negative charge existing on the upper surface of the sheet S caused by dielectric polarization is also reduced. The contact-type charge eliminating unit 29 comes into contact with the sheet S and directly applies voltage thereto, such that the charge eliminating effect is great. Meanwhile, the dispersion of surface potential of the sheet S after charge elimination is high, and elimination of charge tends to be uneven. The charge-eliminating high voltage substrate 230, which is one example of a second substrate for applying voltage to the charge eliminating roller pair 30, may adopt the same configuration as that of a high voltage substrate used for purposes other than eliminating charge in the image forming system 1. For example, the image forming apparatus 2 includes a high voltage substrate 101 (refer to FIG. 2) which is an example of a first substrate for applying voltage to the image developing unit and the transfer unit of the image forming unit 10. The charge-eliminating high voltage substrate 230 may adopt the same configuration as that of the high voltage substrate 101. In this case, the manufacturing cost may be cut down by adopting a common configuration for the substrate.

Noncontact-Type Charge Eliminating Unit

Figure 4A:
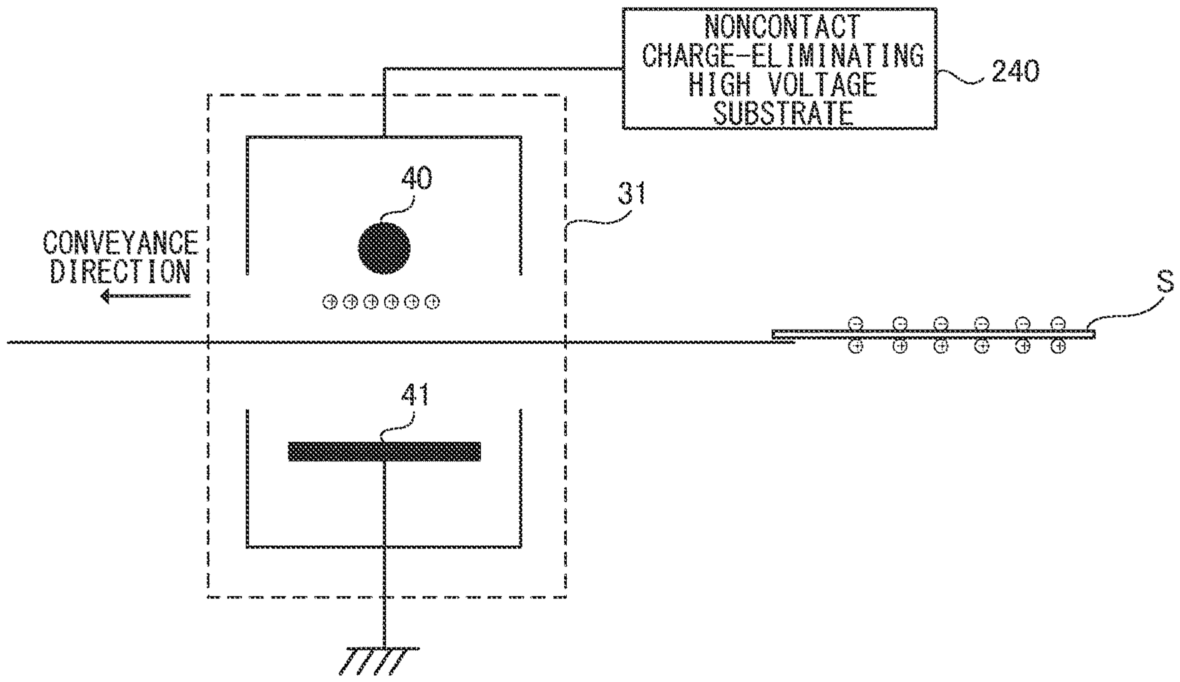
FIG. 4A is a cross-sectional view illustrating a state prior to eliminating charge of a sheet in a noncontact-type charge eliminating unit according to the embodiment.
Figure 4B:
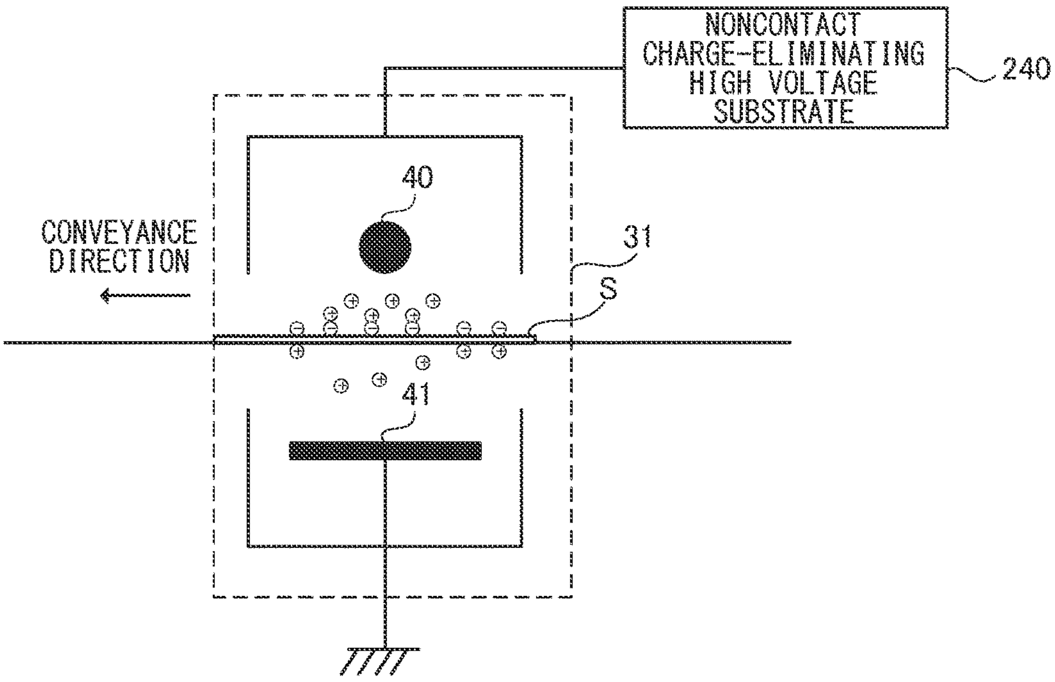
FIG. 4B is a cross-sectional view illustrating a state in which charge of a sheet is eliminated in the noncontact-type charge eliminating unit according to the embodiment.

FIGS. 4A and 4B are each a cross-sectional view illustrating a charge elimination processing by the noncontact-type charge eliminating unit 31. The charge eliminating apparatus 3 according to the present embodiment is equipped with the noncontact-type charge eliminating unit 31 for regulating the surface potential of the sheet S that has become uneven by the charge elimination processing performed by the contact-type charge eliminating unit 29. The noncontact-type charge eliminating unit 31 is an example of the noncontact charge eliminating unit, and it eliminates charge of the sheet S conveyed from the charge eliminating roller pair 30 in a noncontact manner. As illustrated in FIG. 4A, the noncontact-type charge eliminating unit 31 includes an electric discharge wire 40 and a grounding electrode 41. When a positive voltage is applied to the electric discharge wire 40 from a noncontact charge-eliminating high voltage substrate 240, positive charge is generated by corona discharge.

As illustrated in FIG. 4B, the positive charge generated by applying voltage to the electric discharge wire 40 is attracted toward the negative charge on the upper surface of the sheet S by electrostatic force and neutralized. Thereby, the negative charge on the upper surface of the sheet S is eliminated. Further, the positive charge on the lower surface of the sheet S is eliminated by being attracted to the grounding electrode 41 set to zero potential. The charge eliminating effect on the surface of the sheet S by the noncontact-type charge eliminating unit 31 is smaller than the charge eliminating effect realized by the contact-type charge eliminating unit 29, but the surface potential of the sheet S after eliminating charge has a small dispersion, and charge elimination is performed uniformly. Therefore, the surface potential of the sheet S that has become uneven by charge elimination performed by the contact-type charge eliminating unit 29 may be regulated. Further, according to the present embodiment, an AC corotron system is adopted as the noncontact-type charge eliminating unit, but an ionizer may also be used.

Determination of Voltage of Charge Eliminating Apparatus

In the present embodiment, the charge eliminating apparatus 3 includes both the contact-type charge eliminating unit 29 and the noncontact-type charge eliminating unit 31, but charge elimination of the sheet S is not always performed using both eliminating units. As for the sheet S having a small current resistance, such as plain paper, charge may be eliminated sufficiently by performing the charge elimination using only the noncontact-type charge eliminating unit 31. Meanwhile, as for the sheet S having a large current resistance, such as a synthetic sheet, charge elimination is performed using both the contact-type charge eliminating unit 29 and the noncontact-type charge eliminating unit 31. FIG. 8 is a table illustrating voltages applied by the contact-type charge eliminating unit 29 and the noncontact-type charge eliminating unit 31 according to sheet types. The present table is stored in the HDD 202, wherein the CPU 203 refers to the present table when applying high voltage, and instructs to apply high voltage to the charge-eliminating high voltage control unit 222 and the noncontact charge-eliminating high voltage control unit 224 through the communication I/F 201.

Attaching and Detaching Mechanism

Figure 5A:
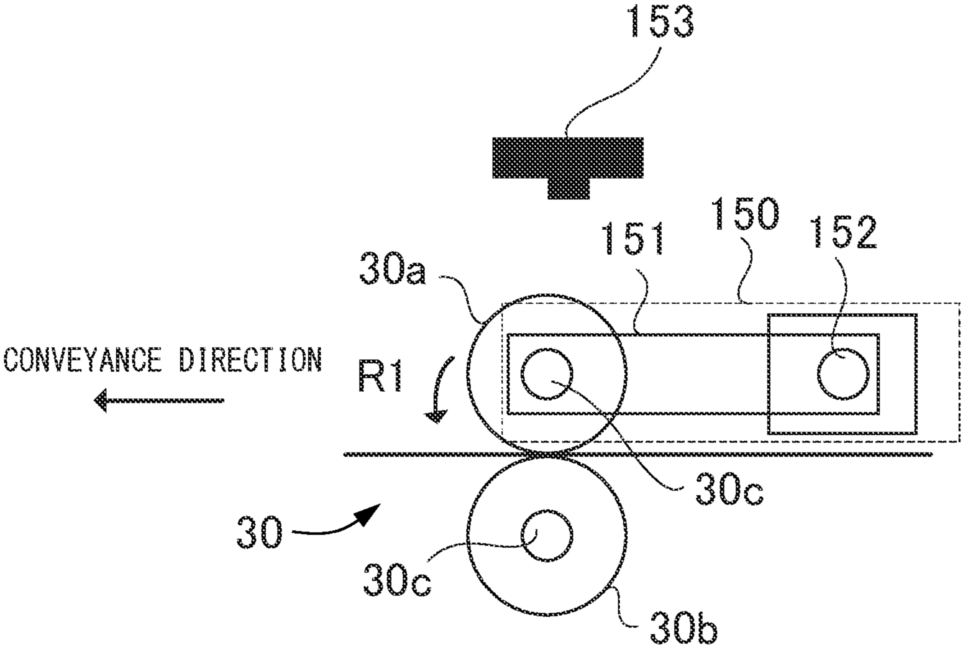
FIG. 5A is a side view illustrating an attached state in an attaching and detaching mechanism according to the embodiment.
Figure 5B:
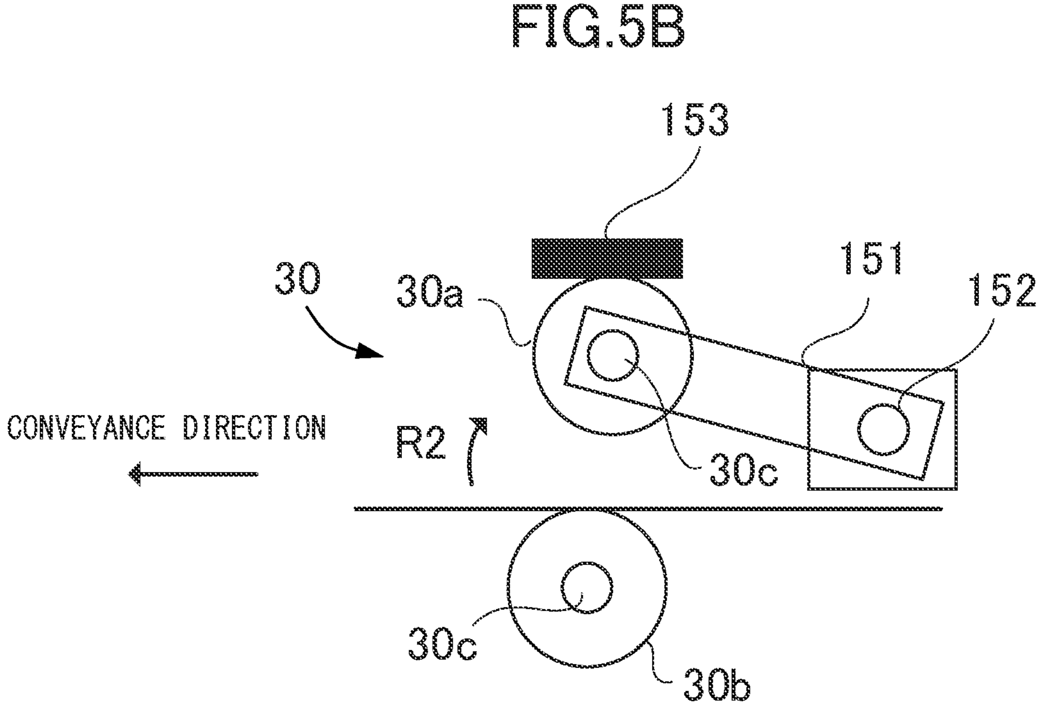
FIG. 5B is a side view illustrating a detached state in the attaching and detaching mechanism according to the embodiment.

The charge eliminating roller pair 30 disposed in the contact-type charge eliminating unit 29 is worn each time a sheet S is conveyed, and the charge elimination ability may be deteriorated thereby. Therefore, according to the present embodiment, the charge eliminating rollers 30*a* and 30*b* are movable to a contact position where each of the charge eliminating rollers 30*a* and 30*b* come into contact with the sheet S and to a retracting position where they are separated from the sheet S. Further, as illustrated in FIGS. 5A and 5B, the charge eliminating apparatus 3 is provided with the attaching and detaching mechanism 150 which is an example of a moving unit for moving the charge eliminating rollers 30*a* and 30*b* to the contact position and the retracting position. Thereby, when eliminating charge using only the noncontact-type charge eliminating unit 31, the charge eliminating apparatus 3 may position the charge eliminating rollers 30*a* and 30*b* at the retracting position. In the present specification, the switching of the charge eliminating rollers 30*a* and 30*b* between the contact position and the retracting position is called attaching and detaching, the positioning of the rollers at the contact position is called an attaching operation, the state in which the rollers are positioned at the contact position is called an attached state, the positioning of the rollers at the retracting position is called a detaching operation, and the state in which the rollers are positioned at the retracting position is called a detached state.

FIGS. 5A and 5B are each a cross-sectional view of the attaching and detaching mechanism 150 performing attachment and detachment of the charge eliminating roller pair 30. As illustrated in FIGS. 5A and 5B, the attaching and detaching mechanism 150 is attached to the charge eliminating roller 30*a*. The attaching and detaching mechanism 150 includes a swing arm 151 that swings about a swing fulcrum 152. As illustrated in FIG. 5A, when an attachment and detachment motor not shown is driven to rotate in the normal direction and the swing arm 151 is rotated in an R1 direction, the charge eliminating roller 30*a* abuts against the charge eliminating roller 30*b*, i.e., is positioned at the contact position, and the attaching operation of the charge eliminating roller 30*a* and the charge eliminating roller 30*b* is completed.

Meanwhile, as illustrated in FIG. 5B, when the attachment and detachment motor is driven to rotate in the reverse direction, the swing arm 151 rotates in an R2 direction, and an attachment and detachment sensor 153 composed of a push switch disposed on an upper portion of the attaching and detaching mechanism 150 is pressed by the charge eliminating roller 30*a*. When the attachment and detachment sensor 153 is turned on, the CPU 203 determines that the charge eliminating roller pair 30 is positioned at the retracting position, such that the CPU 203 stops the attachment and detachment motor, and completes the detaching operation of the charge eliminating roller 30*a* and the charge eliminating roller 30*b*. In the present embodiment, upon performing the attachment and detachment operation of the charge eliminating roller pair 30, the grounded charge eliminating roller 30*a* moves and the charge eliminating roller 30*b* connected to the charge-eliminating high voltage substrate 230 does not move, but the present technique is not limited thereto. For example, the charge eliminating roller 30*b* may be moved and the charge eliminating roller 30*a* may not be moved. Alternatively, both charge eliminating rollers 30*a* and 30*b* may be moved.

Detaching Operation and Attaching Operation

Figure 6:
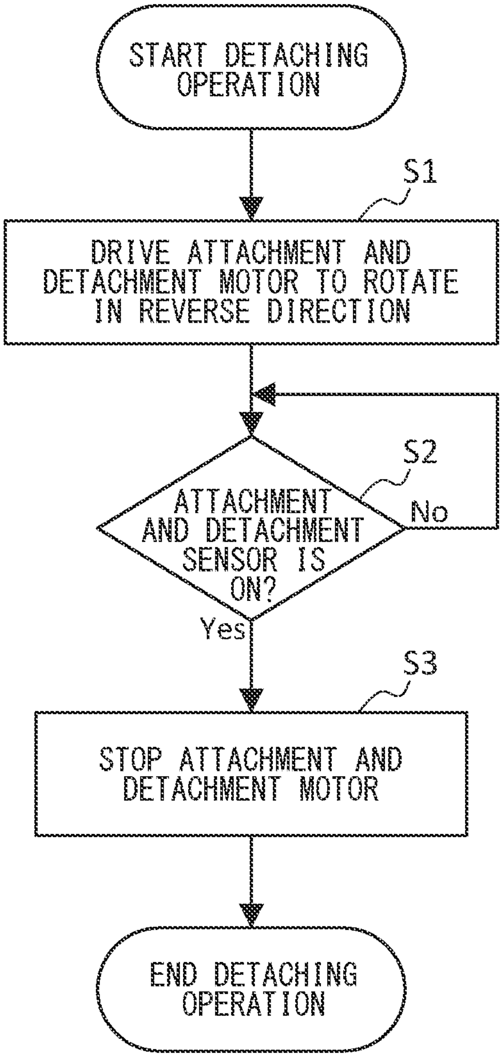
FIG. 6 is a flowchart illustrating a detaching operation in the attaching and detaching mechanism according to the embodiment.

Next, a procedure of the detaching operation and the attaching operation of the charge eliminating roller pair 30 will be described with reference to the flowcharts illustrated in FIGS. 6 and 7. FIG. 6 is a flowchart of the detaching operation. When the detaching operation is started, the CPU 203 instructs a detaching operation of the charge eliminating roller pair 30 to the attachment and detachment control unit 223 through the communication I/F 201. When the instruction of the detaching operation is received from the CPU 203, the attachment and detachment control unit 223 drives the attachment and detachment motor to rotate in a reverse direction at a predetermined speed, and starts the detaching operation (S1). When the detaching operation is started, the CPU 203 acquires an output of the attachment and detachment sensor 153 through the communication I/F 201. The CPU 203 determines whether the attachment and detachment sensor 153 is in an on state (step S2). When it is determined that the attachment and detachment sensor 153 is not in an on state (step S2: No), the CPU 203 determines again whether it is in an on state (step S2). When it is determined that the attachment and detachment sensor 153 is in an on state (step S2: Yes), the CPU 203 stops the attachment and detachment motor (step S3), and ends the detaching operation.

Figure 7:
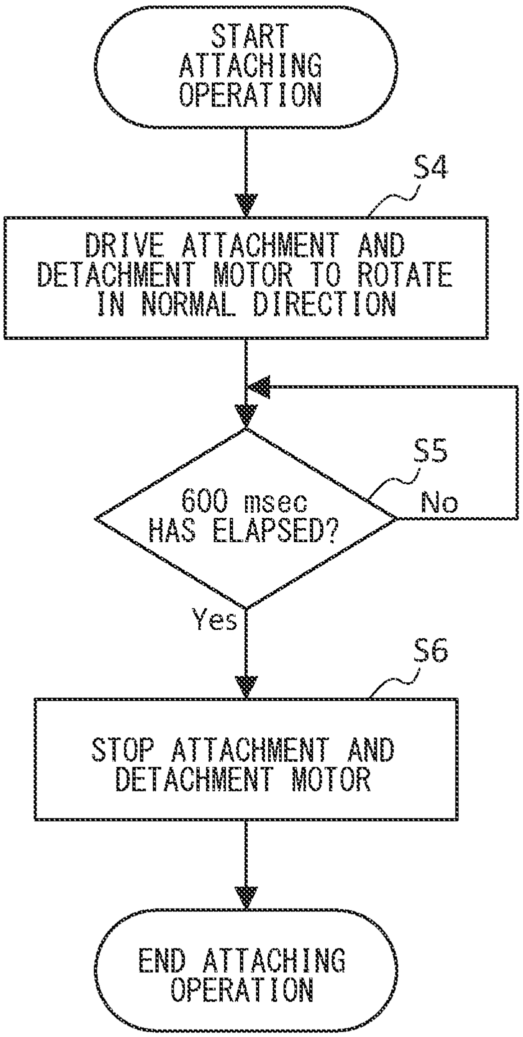
FIG. 7 is a flowchart illustrating an attaching operation in the attaching and detaching mechanism according to the embodiment.

FIG. 7 is a flowchart of the attaching operation. When the attaching operation is started, the CPU 203 instructs the attachment and detachment control unit 223 to start the attaching operation through the communication I/F 201. When the instruction of the attaching operation from the CPU 203 is received, the attachment and detachment control unit 223 drives the attachment and detachment motor to rotate in a normal direction at a predetermined speed, and starts the attaching operation (S4). When the attaching operation is started, the CPU 203 determines whether 600 msec has elapsed from the starting of drive of the attachment and detachment motor (S5). When it is determined that 600 msec has not elapsed (step S5: No), the CPU 203 determines again whether the time has elapsed (step S5). When the CPU 203 determines that 600 msec has elapsed (step S5: Yes), the CPU 203 instructs the attachment and detachment control unit 223 to end the attaching operation through the communication I/F 201. When the instruction to end the attaching operation is received from the CPU 203, the attachment and detachment control unit 223 stops the attachment and detachment motor (S6), and ends the attaching operation. By adopting the above-described procedure, it becomes possible to switch the attached and detached states of the charge eliminating rollers 30*a* and 30*b* using the attaching and detaching mechanism 150 and to suppress wear of the charge eliminating rollers 30*a* and 30*b*.

Operations Regarding Sheet Requiring Charge Elimination and Sheet not Requiring the Same Next, operations regarding a sheet that requires charge elimination by the contact-type charge eliminating unit 29 and a sheet that does not require charge elimination thereby will be described with reference to FIGS. 9A to 9E. A synthetic sheet is used as an example of a sheet that requires charge elimination by the contact-type charge eliminating unit 29. Further, a plain paper is used as an example of a sheet that does not require charge elimination by the contact-type charge eliminating unit 29. Furthermore, a sheet sequence in a case where the synthetic sheets and the plain paper are mixed in an image forming job, hereinafter also simply referred to as a job, is referred to as a mixed sheet sequence. Further, a job in which different types of sheets, such as the synthetic sheet and plain paper, are conveyed is referred to as a mixed job. In the present embodiment, the sheet that requires charge elimination by the contact-type charge eliminating unit 29 is referred to as a first type of sheet, i.e., synthetic sheet, and the sheet that does not require charge elimination by the contact-type charge eliminating unit 29 is referred to as a second type of sheet, i.e., plain paper, that differs from the first type of sheet.

Figure 9A:
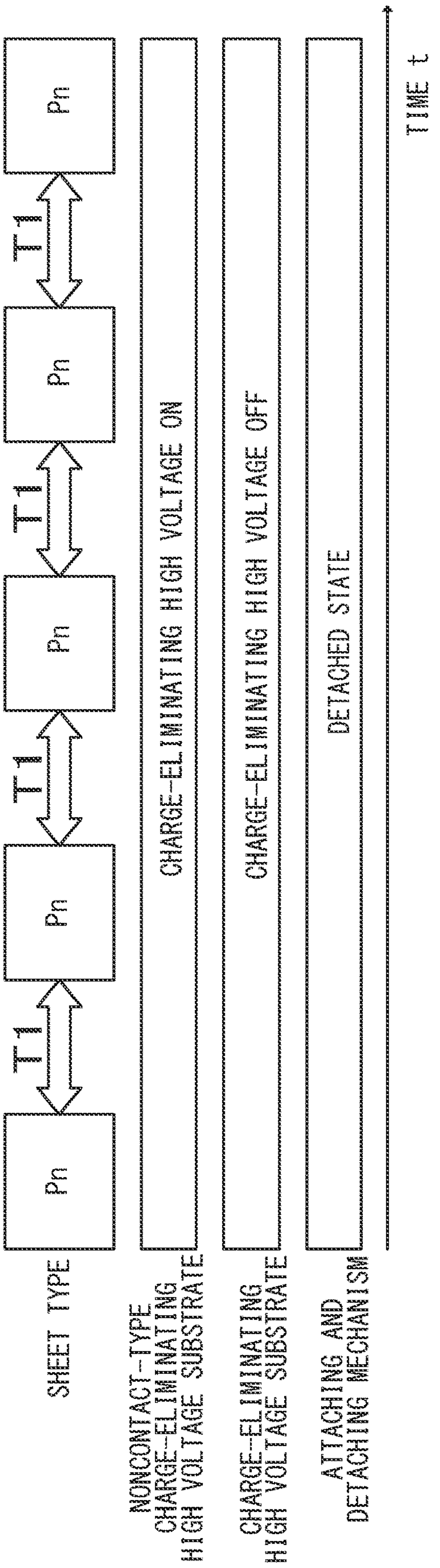
FIG. 9A is a time chart illustrating a charge elimination processing of a sheet sequence according to the embodiment, wherein the sheet sequence of plain paper is illustrated.
Figure 9B:
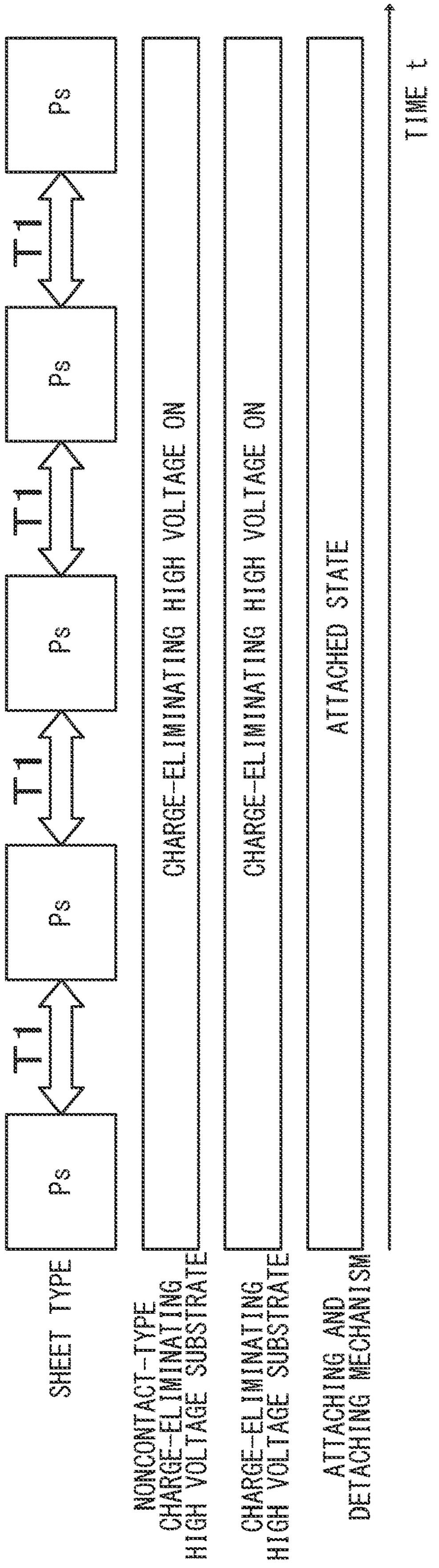
FIG. 9B is a time chart illustrating the charge elimination processing of the sheet sequence according to the embodiment, wherein the sheet sequence of synthetic sheets is illustrated.
Figure 9C:
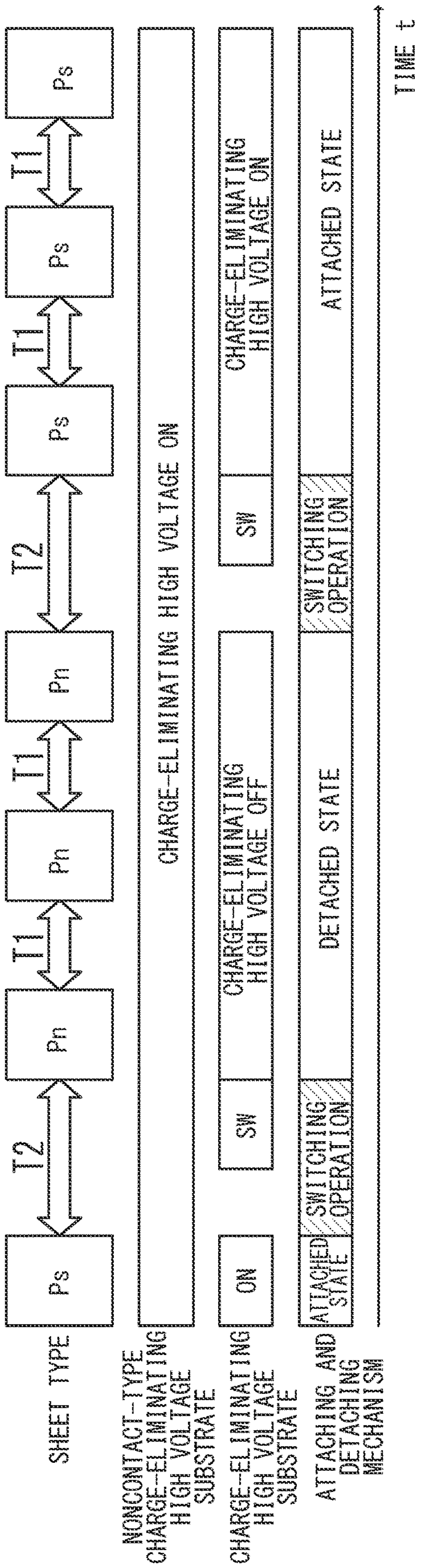
FIG. 9C is a time chart illustrating the charge elimination processing of the sheet sequence according to the embodiment, wherein a comparison example of a mixed sheet sequence is illustrated.
Figure 9D:
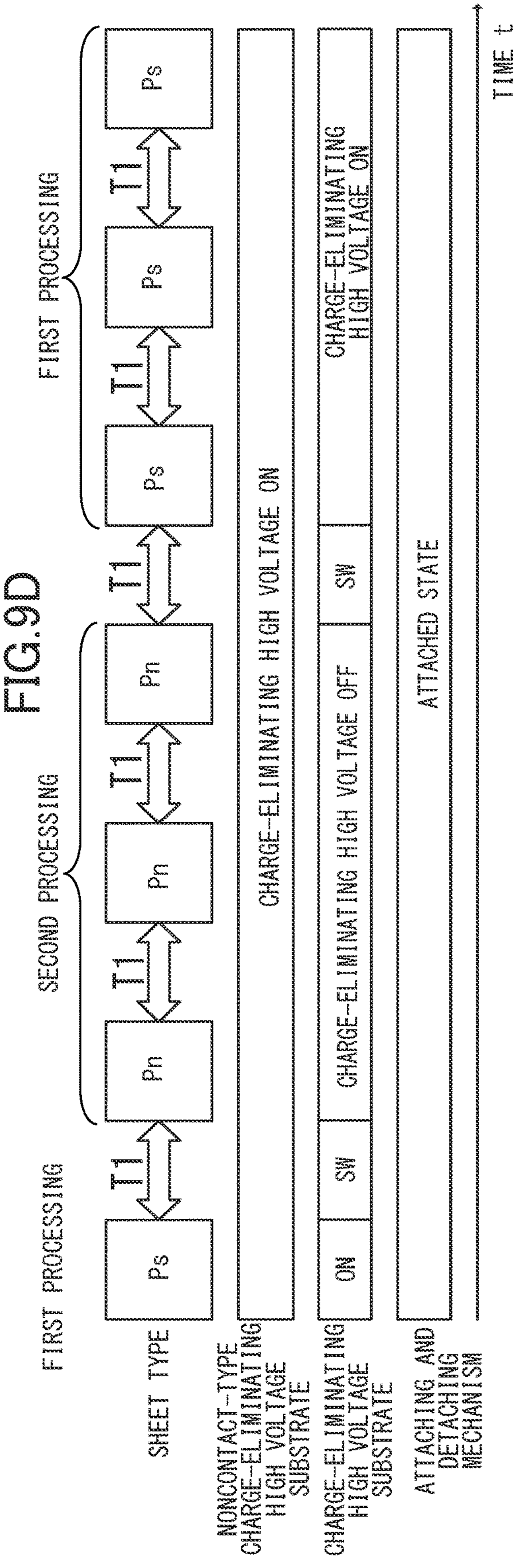
FIG. 9D is a time chart illustrating the charge elimination processing of the sheet sequence according to the embodiment, wherein a second processing of a mixed sheet sequence is illustrated.
Figure 9E:
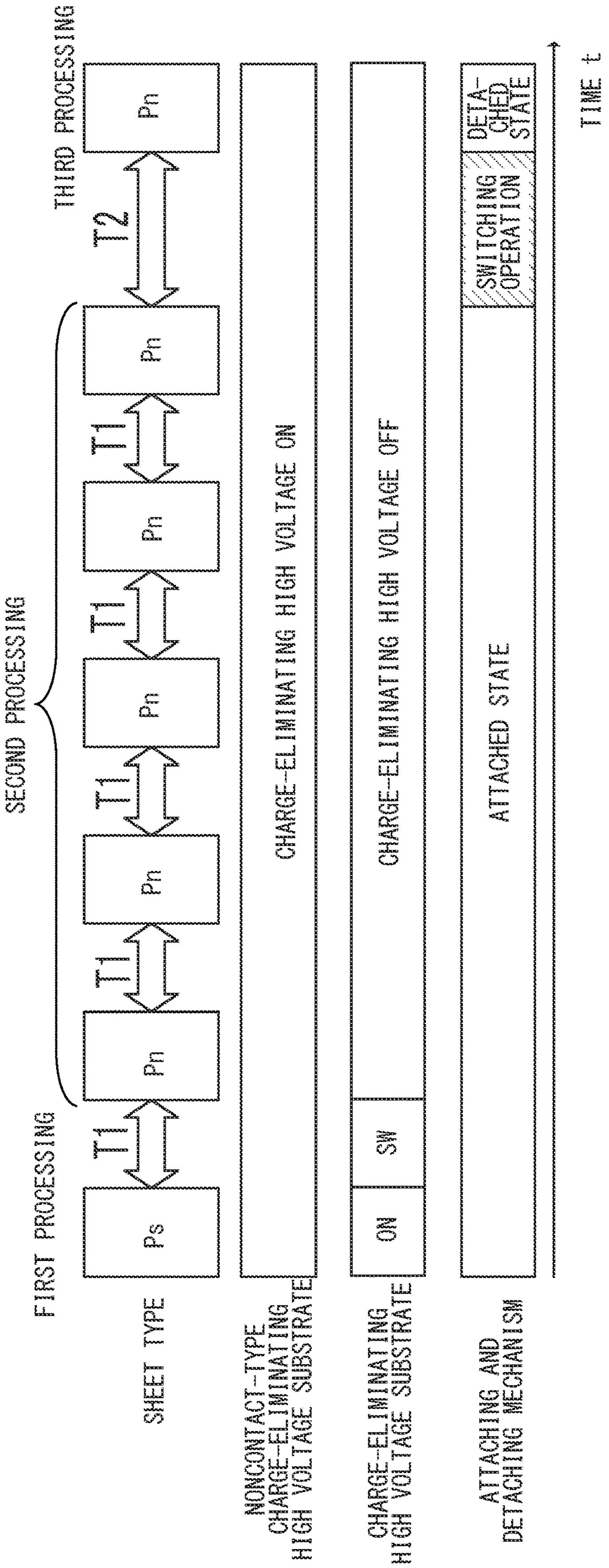
FIG. 9E is a time chart illustrating the charge elimination processing of the sheet sequence according to the embodiment, wherein a third processing of a mixed sheet sequence is illustrated.

FIG. 9A is a time chart illustrating an operation performed in a job regarding plain paper that does not require charge elimination by the contact-type charge eliminating unit 29, and FIG. 9B is a time chart illustrating an operation performed in a job regarding synthetic sheets that require charge elimination by the contact-type charge eliminating unit 29. FIGS. 9C to 9E are each a time chart illustrating a mixed job for a mixed sheet sequence composed of plain paper that requires charge elimination by the contact-type charge eliminating unit 29 and synthetic sheet that does not require charge elimination thereby, wherein FIG. 9C is a comparison example, and FIGS. 9D and 9E illustrate the operations of the present embodiment. It is noted that a sign "Pn" denotes "plain paper" and a sign "Ps" denotes "synthetic sheet" in the FIGS. 9A to 9E. Also, a sign "SW" denotes "switching operation".

FIG. 9A is a time chart of a job regarding five sheets of plain paper that does not require charge elimination by the contact-type charge eliminating unit 29. That is, the job illustrated in FIG. 9A is an example of a second job in which only the type of sheet that does not require charge elimination by the contact-type charge eliminating unit 29 is conveyed. The noncontact-type charge eliminating unit 31 performs charge elimination for all types of sheets, such that from the start to the end of the job, the noncontact charge-eliminating high voltage substrate 240 sets the high voltage to an on state. Since charge elimination by the contact-type charge eliminating unit 29 is not required for plain paper having a low current resistance, the charge-eliminating high voltage substrate 230 sets the high voltage to an off state, and the charge eliminating roller pair 30 opposed to the attaching and detaching mechanism 150 is set to a detached state. As described, by setting the charge eliminating roller pair 30 in a detached state, wear of the charge eliminating roller pair 30 may be prevented. Thus, in a second job in which only the type of sheet that does not require charge elimination by the contact-type charge eliminating unit 29 is conveyed, the CPU 203 executes a third processing in that the charge eliminating roller pair 30 is moved to the retracting position by the attaching and detaching mechanism 150 so as not to perform charge elimination of the sheet. That is, regarding the second type of sheet in which charge elimination by the contact-type charge eliminating unit 29 is not necessary, the CPU 203 does not execute charge elimination processing by the charge eliminating roller pair 30.

FIG. 9B is a time chart of a job regarding five sheets of synthetic paper that requires charge elimination by the contact-type charge eliminating unit 29. That is, the job illustrated in FIG. 9B is an example of a first job in which only the type of sheet that requires charge elimination by the contact-type charge eliminating unit 29 is conveyed. Since the synthetic sheet having a large current resistance requires charge elimination by the contact-type charge eliminating unit 29, the high voltage of the charge-eliminating high voltage substrate 230 is set to an on state, and the charge eliminating roller pair 30 opposed to the attaching and detaching mechanism 150 is set to an attached state. As described, in a first job in which only the type of sheet that requires charge elimination by the contact-type charge eliminating unit 29 is conveyed, the CPU 203 executes a first processing in which charge of the sheet is eliminated by applying voltage to the charge eliminating roller pair 30 in a state where the charge eliminating roller pair 30 is positioned at the contact position. That is, as for the first type of sheet that requires charge elimination by the contact-type charge eliminating unit 29, the CPU 203 executes the charge elimination processing by the charge eliminating roller pair 30. T1 illustrated in FIG. 9B, for example, refers to a minimum required time interval between sheets that is necessary to form an image on plain paper or synthetic sheet and to convey the sheet.

FIG. 9C is a time chart illustrating an operation according to a comparison example regarding a mixed job including synthetic sheets that require charge elimination by the contact-type charge eliminating unit 29 and plain paper that does not require charge elimination thereby. In this example, it is assumed that a mixed sheet sequence is conveyed in which the first type of sheet, i.e., synthetic sheet, and the second type of sheet, i.e., plain paper, are conveyed in a mixed manner.

When switching from synthetic sheet to plain paper, a switching operation of the attaching and detaching mechanism 150 to the detached state is started after a trailing edge of the synthetic sheet has passed through the contact-type charge eliminating unit 29. The time required for switching the charge eliminating roller pair 30 to the detached state by the attaching and detaching mechanism 150 is long compared to a time interval between sheets T1 of the synthetic sheet. Therefore, a time interval between sheets T2 must be set longer than the time interval between sheets T1 such that a subsequent synthetic sheet arrives at the contact-type charge eliminating unit 29 after the charge eliminating roller pair 30 has been switched to the detached state. Further, since the switching operation of high voltage performed by the charge-eliminating high voltage substrate 230 falls within the time interval between sheets T1 of the synthetic sheet, the switching may be performed before the leading edge of plain paper reaches the contact-type charge eliminating unit 29.

Similarly, when switching from plain paper to synthetic sheet, a switching operation of the attaching and detaching mechanism 150 to the attached state is started after a trailing edge of plain paper has passed through the contact-type charge eliminating unit 29. The time required for switching the charge eliminating roller pair 30 to the attached state by the attaching and detaching mechanism 150 is long compared to the time interval between sheets T1 of plain paper. Therefore, the time interval between sheets T2 must be set longer than the time interval between sheets T1 such that the subsequent synthetic sheet arrives at the contact-type charge eliminating unit 29 after the charge eliminating roller pair 30 has been switched to the attached state. Further, the switching operation of high voltage by the charge-eliminating high voltage substrate 230 may be performed within the time interval between sheets T1 of plain paper, such that the switching operation may be performed before the leading edge of the synthetic sheet arrives at the contact-type charge eliminating unit 29. As described, in a case where the first type of sheet, i.e., synthetic sheet, is conveyed to the charge eliminating roller pair 30, the CPU 203 executes the first processing in which charge of the sheet is eliminated by applying voltage to the charge eliminating roller pair 30 in a state where the charge eliminating roller pair 30 is positioned at the contact position.

According to the comparison example, in a mixed job in which the sheets that require charge elimination and sheets that do not require the same are mixed, there was a problem in that time was required for switching performed by the attachment and detachment operation and that the productivity may be deteriorated. Therefore, according to the present embodiment, in the mixed job as described above, the attaching and detaching mechanism 150 is maintained in the attached state and only the high voltage output by the charge-eliminating high voltage substrate 230 is switched to an off state for a sheet that does not require charge elimination by the contact-type charge eliminating unit 29, by which the deterioration of productivity may be suppressed.

FIG. 9D is a time chart illustrating the operation according to the present embodiment performed for the mixed job that is the same as that of FIG. 9C. When switching from the synthetic sheet that requires charge elimination by the contact-type charge eliminating unit 29 to plain paper that does not require charge elimination by the contact-type charge eliminating unit 29, the attached state of the attaching and detaching mechanism 150 is maintained, and the switching operation of high voltage by the charge-eliminating high voltage substrate 230 is started after the trailing edge of the synthetic sheet has passed through the contact-type charge eliminating unit 29. The operation for switching from the on state of the charge eliminating high voltage to the off state of the charge eliminating high voltage falls within the time interval between sheets T1, such that there is no need to extend the interval between sheets to wait for the switching of high voltage.

Similarly, when switching from plain paper to synthetic sheet, the attached state of the attaching and detaching mechanism 150 is maintained, and after the trailing edge of plain paper has passed through the contact-type charge eliminating unit 29, the switching operation of high voltage by the charge-eliminating high voltage substrate 230 is started. The operation for switching from the off state of the charge eliminating high voltage to the on state of the charge eliminating high voltage falls within the time interval between sheets T1 of plain paper, such that there is no need to extend the interval between sheets to wait for the switching of high voltage.

As described, according to the present embodiment, in a mixed job in which the sheet that requires charge elimination by the contact-type charge eliminating unit 29 and sheets that do not require the same are mixed, the attached state is maintained, and only the output of high voltage by the charge-eliminating high voltage substrate 230 of the contact-type charge eliminating unit 29 is subjected to switching operation. That is, in the mixed job, regarding the first type of sheet, i.e., synthetic sheet, the CPU 203 executes the first processing in which charge of the sheet is eliminated by applying voltage to the charge eliminating roller pair 30 in a state where the charge eliminating roller pair 30 is positioned at the contact position. Meanwhile, regarding the second type of sheet, i.e., plain paper, the CPU 203 executes the second processing of not eliminating charge of the sheet without applying voltage to the charge eliminating roller pair 30 in a state where the charge eliminating roller pair 30 is positioned at the contact position. Therefore, the deterioration of productivity may be prevented. As described above, in this embodiment, the CPU 203 executes the first processing and the second processing. The first processing is a processing in which charge of a sheet is eliminated by applying voltage to the charge eliminating roller pair 30 in a state where the charge eliminating roller pair 30 is positioned at the contact position. And the second processing is a processing in which charge of a sheet is not eliminated while voltage is not applied to the charge eliminating roller pair 30 in a state where the charge eliminating roller pair 30 is positioned at the contact position. In the mixed job in which the first type of sheet and the second type of sheet are conveyed, the CPU 203 executes the first processing to the first type of sheet and executes the second processing to the second type of sheet.

FIG. 9E is a time chart illustrating the operation of the present embodiment in a mixed job in which synthetic sheet that requires charge elimination by the contact-type charge eliminating unit 29 and plain paper that does not require charge elimination thereby are mixed, wherein plain paper that does not require charge elimination by the contact-type charge eliminating unit 29 is conveyed successively. When switching from synthetic sheet that requires charge elimination by the contact-type charge eliminating unit 29 to plain paper that does not require charge elimination by the contact-type charge eliminating unit 29, the attached state of the attaching and detaching mechanism 150 is maintained, and after the trailing edge of the synthetic sheet has passed through the contact-type charge eliminating unit 29, the switching operation of high voltage by the charge-eliminating high voltage substrate 230 is started. The operation of switching from the on state of the charge eliminating high voltage to the off state of the charge eliminating high voltage falls within the time interval between sheets T1, such that there is no need to extend the interval between sheets to wait for the switching of high voltage.

However, if plain paper that does not require charge elimination is fed successively thereafter, wear of the charge eliminating roller pair 30 continues to advance. Therefore, in the present embodiment, the switching operation by the attaching and detaching mechanism 150 to the detached state is started after the trailing edge of the fifth plain paper has passed through the contact-type charge eliminating unit 29. The time required for the charge eliminating roller pair 30 to switch to the detached state by the attaching and detaching mechanism 150 is long compared to the time interval between sheets T1 of plain paper. Therefore, the time interval between sheets T2 is extended such that the subsequent synthetic sheet arrives at the contact-type charge eliminating unit 29 after waiting for the charge eliminating roller pair 30 to be changed to the detached state.

Thus, according to the present embodiment, in a mixed job in which a sheet requiring charge elimination by the contact-type charge eliminating unit 29 and a sheet that does not require the same are mixed, in a case where the sheet that does not require charge elimination by the contact-type charge eliminating unit 29 is conveyed successively, the state is switched to the detached state. That is, in a case where the second type of sheet, i.e., plain paper, is conveyed to the charge eliminating roller pair 30 successively exceeding a predetermined number of sheets, which according to the present embodiment is five, the CPU 203 may execute a third processing in which charge elimination of the sheet is not performed by moving the charge eliminating roller pair 30 to the retractive position by the attaching and detaching mechanism 150. In this embodiment, in a case where a plurality of the second type of sheet that exceeds a predetermined number of sheets in number is conveyed successively to the charge eliminating roller pair 30 in the mixed job, the CPU 203 executes the third processing. That is, the CPU 203 may execute a first mode in which the first processing, the second processing, and the third processing are executed in a switched manner (refer to FIG. 9E). Thereby, deterioration of productivity may be prevented while suppressing wear of the charge eliminating roller pair 30. In the present embodiment, the predetermined number of sheets, which is a threshold for switching processes, is set to five sheets, but the present technique is not limited thereto. The predetermined number of sheets may be set based on the life of the charge eliminating rollers 30*a* and 30*b* of the charge eliminating roller pair 30, and for example, the number may be set to more than five sheets if the charge eliminating rollers 30*a* and 30*b* are made of a material having a long life.

Attaching and Detaching Mode Switching Operation

Figure 10:
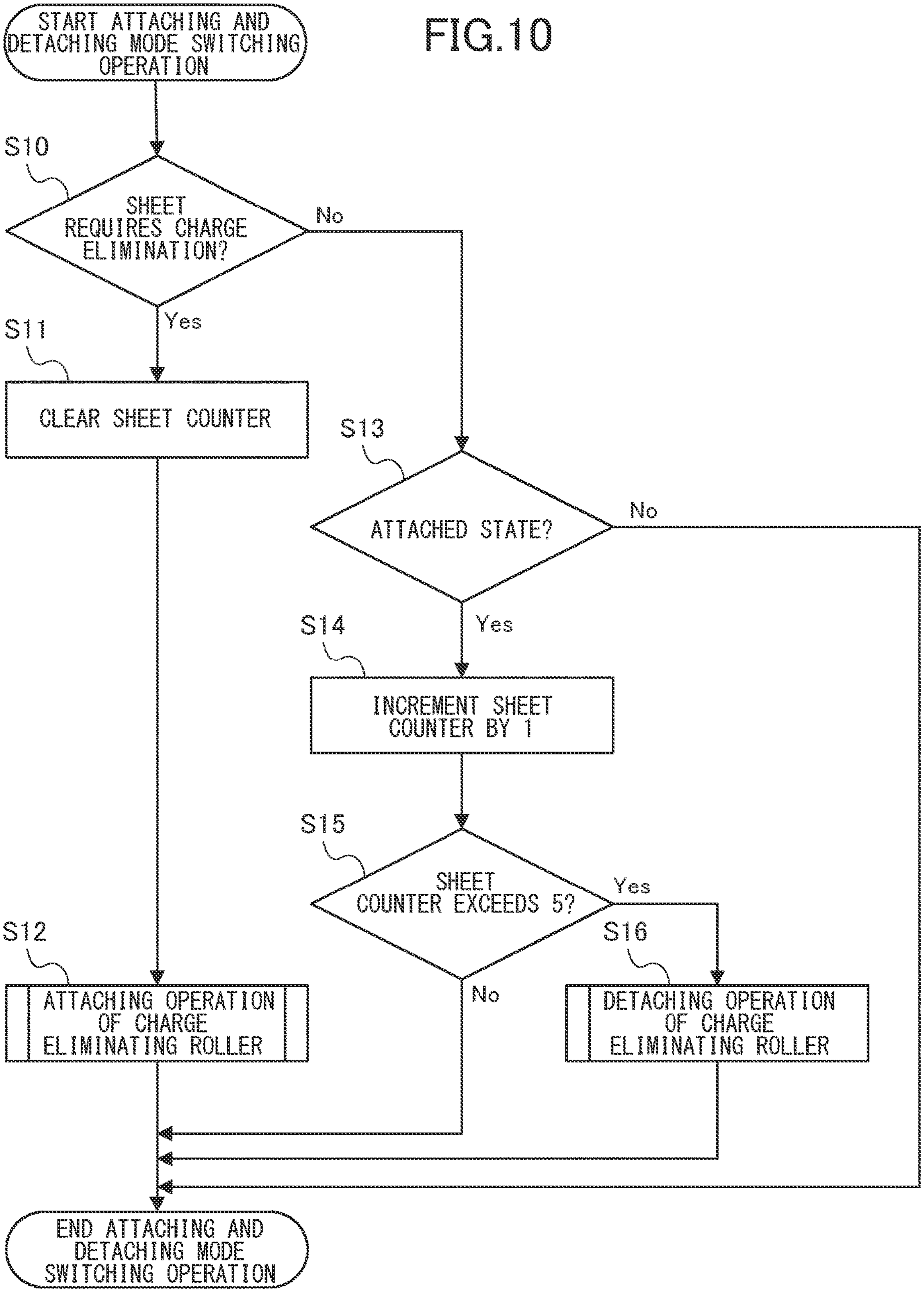
FIG. 10 is a flowchart illustrating a processing procedure of an attaching and detaching mode switching operation according to the present embodiment.

Next, an operation flow for switching the attaching and detaching modes according to the present embodiment will be described with reference to the flowchart illustrated in FIG. 10. The processing illustrated in this flowchart is executed by the CPU 203. When the start of the attaching and detaching mode switching operation is instructed, the CPU 203 determines whether the relevant sheet requires charge elimination by the contact-type charge eliminating unit 29 (step S10). When it is determined that the sheet requires charge elimination by the contact-type charge eliminating unit 29 (step S10: Yes), the CPU 203 clears the sheet counter (step S11). The sheet counter counts the number of sheets that do not require charge elimination by the contact-type charge eliminating unit 29 that have been processed in the attached state, and the determination processing thereof will be described later. The CPU 203 instructs an attaching operation of the attaching and detaching mechanism 150 to the attachment and detachment control unit 223 (step S12). The attachment and detachment control unit 223 executes an attaching operation of the flowchart illustrated in FIG. 6, and sets the charge eliminating roller pair 30 to the attached state. In this case, according to the present embodiment, the CPU 203 executes the first processing.

Meanwhile, in a state where it is determined that the sheet does not require charge elimination by the contact-type charge eliminating unit 29 (step S10: No), the CPU 203 determines whether it is in an attached state (step S13). When it is determined that it is not in an attached state (step S13: No), the CPU 203 ends the processing while maintaining the detached state. When it is determined that it is in an attached state (step S13: Yes), the CPU 203 increments the counter by 1 (step S14). Then, the CPU 203 determines whether the sheet counter has exceeded five (step S15). When it is determined that the sheet counter has not exceeded five, that is, is equal to or less than five (step S15: No), the CPU 203 maintains the attached state and ends the processing. When it is determined that the sheet counter has exceeded five (step S15: Yes), the CPU 203 instructs the detaching operation of the attaching and detaching mechanism 150 to the attachment and detachment control unit 223 (step S16), and ends the processing.

As described, in a case where the second type of sheet, i.e., plain paper, is conveyed successively to the charge eliminating roller pair 30 exceeding the predetermined number of sheets, such as five sheets, the CPU 203 executes a third processing of moving the charge eliminating roller pair 30 to the retracting position by the attaching and detaching mechanism 150 (step S16). In the present embodiment, in a case where five sheets, which is the predetermined number of sheets, of plain paper have been conveyed successively to the charge eliminating roller pair 30, the CPU 203 switches from the second processing to the third processing starting from the sixth sheet (refer to FIG. 9E). That is, the CPU 203 may switch from the second processing to the third processing on the basis of successively conveyance of the predetermined number of the second type of sheet to the charge eliminating roller pair 30 in the mixed job.

In the present embodiment, an example has been described of a case where after five sheets, which is the predetermined number of sheets, of plain paper have been conveyed successively to the charge eliminating roller pair 30, the CPU 203 switches from the second processing to the third processing starting from the sixth sheet, but the present embodiment is not limited thereto. For example, in a case where the CPU 203 recognizes the contents of the mixed sheet sequence in advance, the CPU 203 recognizes that five or more plain paper will be conveyed successively, such that the second processing may be switched to the third processing from an arbitrary number of sheets, such as the first or second sheet of plain paper that are conveyed successively. That is, in a case where it is determined that a number of second type of sheet that exceeds the predetermined number of sheets is conveyed successively to the charge eliminating roller pair 30, the CPU 203 may switch from the second processing to the third processing at an arbitrary number of sheets. The CPU 203 may switch from the second processing to the third processing on the basis of the CPU 203 determining that the plurality of the second type of sheet that exceed the predetermined number of sheets in number will be conveyed successively to the charge eliminating roller pair 30 in the mixed job. In that case, when a third processing is executed in the mixed job, in a state where a synthetic sheet serving as the first type of sheet is conveyed to the charge eliminating roller pair 30 (step S10: Yes), the CPU 203 switches from the third processing to the first processing starting from the synthetic sheet (step S12). That is, the CPU 203 may switch from the third processing to the first processing on the basis of conveyance of the first type of sheet to the charge eliminating roller pair 30 in the third processing in the mixed job.

Operation Flow of Present Embodiment

Figure 11:
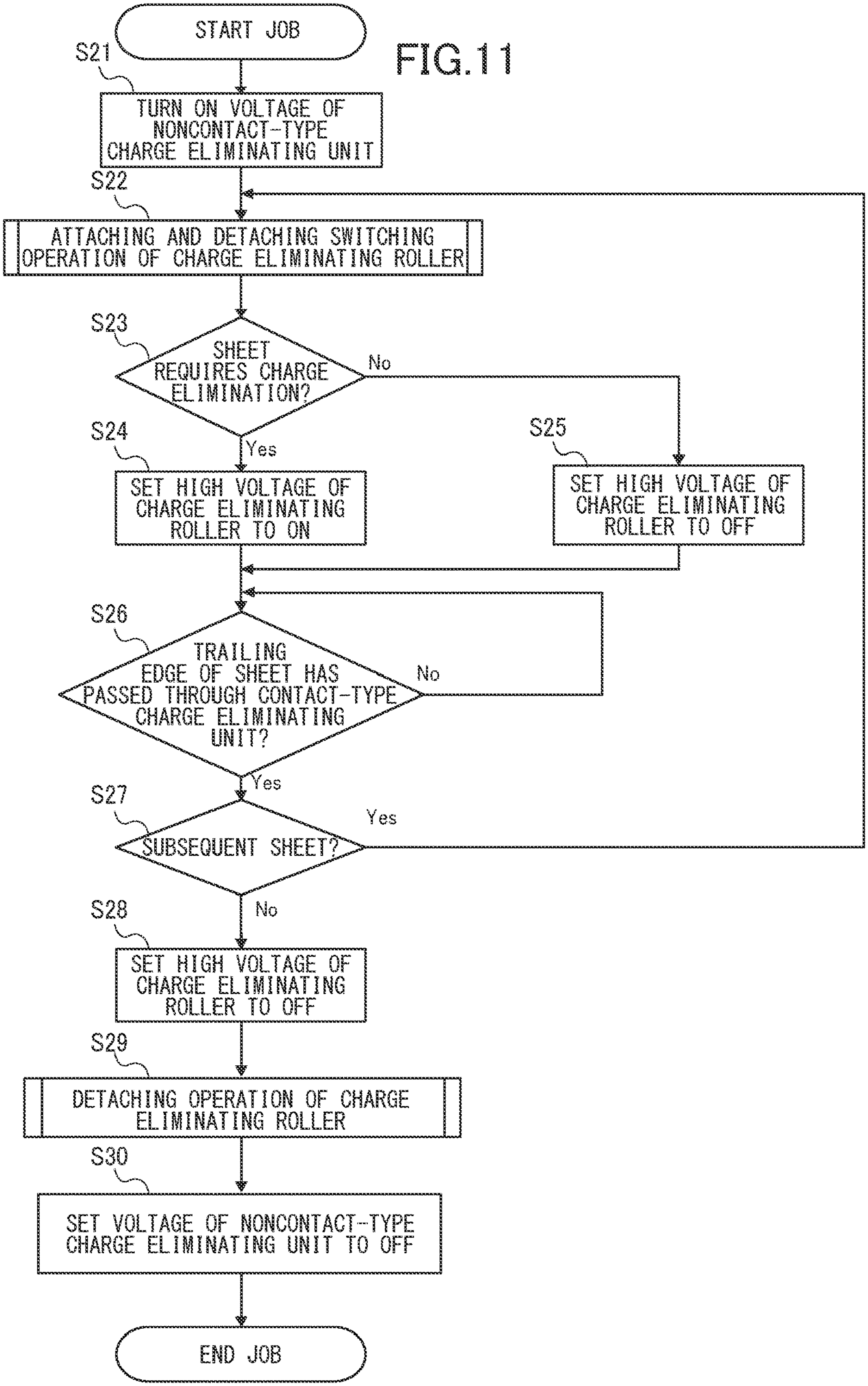
FIG. 11 is a flowchart illustrating a processing procedure of a charge elimination processing according to the present embodiment.

Next, a control flow according to the present embodiment will be described using the flowchart illustrated in FIG. 11. In the present embodiment, if a predetermined number of sheets or more that do not require charge elimination exists successively in a mixed job, the charge eliminating roller pair 30 is set to the detached state. That is, the CPU 203 executes a first mode (refer to FIG. 9E) of switching between and executing the first processing, the second processing, and the third processing. The processing illustrated in the flowchart is executed by the CPU 203. When the job is started, the CPU 203 instructs the noncontact charge-eliminating high voltage control unit 224 to apply a high voltage through the communication I/F 201, and applies voltage to the noncontact-type charge eliminating unit 31 (step S21). The CPU 203 executes an attaching and detaching switching operation of the charge eliminating roller pair 30 illustrated in the flowchart of FIG. 10 (step S22). The CPU 203 determines whether the sheet requires charge elimination by the contact-type charge eliminating unit 29 (step S23).

If it is determined that the sheet requires charge elimination by the contact-type charge eliminating unit 29 (step S23: Yes), the CPU 203 instructs the charge-eliminating high voltage control unit 222 to apply a negative voltage to the charge eliminating roller pair 30 (step S24). Meanwhile, if it is determined that the sheet does not require charge elimination by the contact-type charge eliminating unit 29 (step S23: No), the CPU 203 instructs the charge-eliminating high voltage control unit 222 to set the high voltage of the charge eliminating roller pair 30 to an off state (step S25).

Next, the CPU 203 determines whether the trailing edge of the sheet has passed through the contact-type charge eliminating unit 29 (step S26). When it is determined that the trailing edge of the sheet has not passed through the contact-type charge eliminating unit 29 (step S26: No), the CPU 203 determines whether the trailing edge of the sheet has passed through the contact-type charge eliminating unit 29 again (step S26). When it is determined that the trailing edge of the sheet has passed through the contact-type charge eliminating unit 29 (step S26: Yes), the CPU 203 determines whether there is a subsequent sheet (step S27).

When it is determined that there is a subsequent sheet (step S27: Yes), the CPU 203 executes the operation from step S22 again. When it is determined that there is no subsequent sheet (step S27: No), the CPU 203 instructs the charge-eliminating high voltage control unit 222 to set the high voltage to the off state, and sets the negative voltage applied to the charge eliminating roller pair 30 to the off state (step S28). The CPU 203 instructs the attachment and detachment control unit 223 to perform a detaching operation (step S29). The attachment and detachment control unit 223 executes a detaching operation illustrated in the flowchart of FIG. 6, and switches the charge eliminating roller pair 30 to a detached state. If the charge eliminating roller pair 30 is already in the detached state, the detaching operation may not be performed. The CPU 203 instructs the noncontact charge-eliminating high voltage control unit 224 to set the high voltage to the off state through the communication I/F 201, sets the high voltage of the noncontact charge-eliminating high voltage substrate 240 to the off state (step S30), and ends the job.

As described above, according to the charge eliminating apparatus 3 of the present embodiment, when removing charge in a mixed sheet sequence in which a sheet that requires charge elimination by the contact-type charge eliminating unit 29 and a sheet that does not require charge elimination thereby are mixed, when switching from the sheet that requires charge elimination by the contact-type charge eliminating unit 29 to the sheet that does not require charge elimination thereby, the sheet is conveyed while maintaining the charge elimination roller pair 30 in the attached state without applying voltage thereto. Thereby, there is no need to move the charge eliminating roller pair to the contact position and to the retracting position, such that downtime by the attachment and detachment operation may be reduced, and the productivity may be improved.

According to the charge eliminating apparatus 3 of the present embodiment, if a number of sheets that does not require charge elimination by the contact-type charge eliminating unit 29 is conveyed successively exceeding the predetermined number of sheets to the charge eliminating roller pair 30, the charge eliminating roller pair 30 is moved to the retracting position by the attaching and detaching mechanism 150. Thereby, the productivity in a mixed job where sheets that require charge elimination by the contact-type charge eliminating unit 29 and sheets that do not are mixed may be improved while suppressing shortening of life due to wear, by preventing the charge eliminating roller pair 30 from being maintained in the contact state for more than necessary.

According to the embodiment described above, if a number of sheets that do not require charge elimination in a mixed job is successively conveyed for a predetermined number of sheets or more, the charge eliminating roller pair 30 is set to the detached state. That is, the present embodiment illustrates a case where the CPU 203 executes the first mode in which the first processing, the second processing, and the third processing are switched and executed (refer to FIG. 9E), but the present embodiment is not limited thereto. For example, the attached state may be maintained during the mixed job. That is, the CPU 203 may be set to execute the second mode in which the first processing and the second processing are switched and executed regardless of the successive number of sheets that do not require charge elimination (refer to FIG. 9D). In that case, the productivity may be improved even further.

Figure 12:
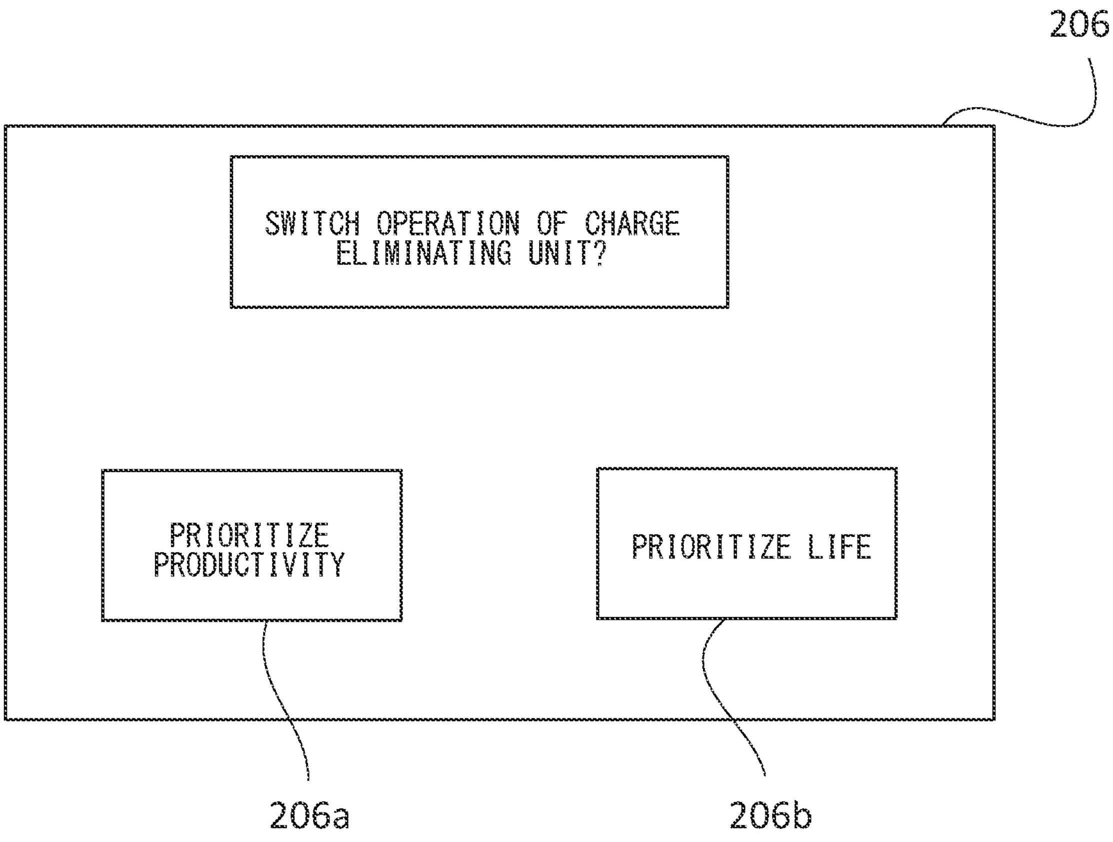
FIG. 12 is a plan view illustrating an operation switching screen of a display according to a modified example.

Further, the first mode (refer to FIG. 9E) and the second mode (refer to FIG. 9D) may be switched by the user according to objects. In that case, for example as illustrated in FIG. 12, the display 206 displays an operation switching screen. The display 206 displays a button **206*a* for prioritizing productivity and a button 206*b* for prioritizing life. When the user presses the button 206*a*, the second mode is executed, and when the user presses the button 206*b*, the first mode is executed. Alternatively, by pressing the button 206*b*, a comparison example (refer to FIG. 9C) may be executed in which the charge eliminating roller pair 30 is set to the detached state for sheets that do not require charge elimination regardless of the number of successive sheets. That is, the display 206 is an example of an input unit, and a selection result between the first mode and the second mode is entered. The CPU 203 executes either one of the first mode and the second mode based on the selected result entered on the display 206**.

According to the present technique, the productivity may be improved.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-071994, filed Apr. 26, 2023, which is hereby incorporated by reference herein in its entirety.

What is claimed is:

1. A charge eliminating apparatus comprising:

a charge eliminating member configured to come into contact with a sheet conveyed and eliminate charge of the sheet by voltage applied to the charge eliminating member;

a moving unit configured to move the charge eliminating member to a contact position in which the charge eliminating member is in contact with the sheet and to a retracting position in which the charge eliminating member is separated from the sheet; and a controller configured to execute a first processing in which charge of a sheet is eliminated by applying voltage to the charge eliminating member in a state where the charge eliminating member is positioned at the contact position, and a second processing in which charge of a sheet is not eliminated while voltage is not applied to the charge eliminating member in a state where the charge eliminating member is positioned at the contact position, wherein, in a mixed job in which a first type of sheet and a second type of sheet that differs from the first type of sheet are conveyed, the controller is configured to execute the first processing to the first type of sheet and execute the second processing to the second type of sheet, and wherein, in a case where a plurality of the second type of sheet that exceeds a predetermined number of sheets in number is conveyed successively to the charge eliminating member in the mixed job, the controller is configured to execute a third processing in which charge of the second type of sheet is not eliminated by moving the charge eliminating member to the retracting position by the moving unit.

2. The charge eliminating apparatus according to claim 1, wherein the controller is configured to switch from the second processing to the third processing on the basis of successively conveyance of the predetermined number of the second type of sheet to the charge eliminating member in the mixed job.

3. The charge eliminating apparatus according to claim 2, wherein the controller is configured to switch from the third processing to the first processing on the basis of conveyance of the first type of sheet to the charge eliminating member in the third processing in the mixed job.

4. The charge eliminating apparatus according to claim 1, wherein the controller is configured to switch from the second processing to the third processing on the basis of the controller determining that the plurality of the second type of sheet that exceed the predetermined number of sheets in number will be conveyed successively to the charge eliminating member in the mixed job.

5. The charge eliminating apparatus according to claim 1, wherein the predetermined number of sheets is five.

6. The charge eliminating apparatus according to claim 1, wherein the controller is configured to execute a first mode in which the first processing, the second processing, and the third processing are executed, and execute a second mode in which the first processing and the second processing are executed.

7. The charge eliminating apparatus according to claim 6, further comprising:

an input unit to which a selection result between the first mode and the second mode is configured to be entered, and wherein the controller is configured to execute either one of the first mode or the second mode based on the selection result entered to the input unit.

8. The charge eliminating apparatus according to claim 1, wherein the controller is configured to execute the first processing in a first job in which only the first type of sheet is conveyed, and execute the third processing in a second job in which only the second type of sheet is conveyed.

9. The charge eliminating apparatus according to claim 1, further comprising:

a noncontact charge eliminating unit arranged downstream of the charge eliminating member in a sheet conveyance direction, and configured to eliminate charge of the sheet conveyed from the charge eliminating member in a noncontact manner.

10. The charge eliminating apparatus according to claim 1, wherein the charge eliminating member is a charge eliminating roller pair including a roller formed of sponge.

11. An image forming system comprising:

an image forming apparatus configured to form an image on a sheet; and the charge eliminating apparatus according to claim 1 configured to receive a sheet to which an image has been formed by the image forming apparatus and to eliminate charge of the sheet.

* * * * *